United States Patent
Isensee et al.

(10) Patent No.: US 10,409,468 B2
(45) Date of Patent: Sep. 10, 2019

(54) VALUE SPECIFICATION IN A RESPONSIVE INTERFACE CONTROL

(71) Applicant: International Business Machines Corporation, Armonk, NY (US)

(72) Inventors: Scott H Isensee, Austin, TX (US); James L Lentz, Austin, TX (US); Andree Proulx, Montreal (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 937 days.

(21) Appl. No.: 14/918,341

(22) Filed: Oct. 20, 2015

(65) Prior Publication Data

US 2016/0041746 A1     Feb. 11, 2016

Related U.S. Application Data

(63) Continuation of application No. 13/485,384, filed on May 31, 2012, now Pat. No. 9,201,562.

(51) Int. Cl.
G06F 3/0484 (2013.01)
G06F 3/0481 (2013.01)
G06F 3/0485 (2013.01)

(52) U.S. Cl.
CPC ........ *G06F 3/04847* (2013.01); *G06F 3/0481* (2013.01); *G06F 3/04855* (2013.01)

(58) Field of Classification Search
CPC .......................... G06F 3/04847; G06F 3/04855
See application file for complete search history.

(56) References Cited

U.S. PATENT DOCUMENTS

| | | |
|---|---|---|
| 5,553,225 A | 9/1996 | Perry |
| 5,877,758 A | 3/1999 | Seybold |
| 6,157,381 A | 12/2000 | Bates et al. |
| 6,204,846 B1 | 3/2001 | Little et al. |
| 6,208,343 B1 | 3/2001 | Roth |
| 6,922,816 B1 | 7/2005 | Amin et al. |
| 7,080,324 B1 | 7/2006 | Nelson et al. |
| 7,085,994 B2 | 8/2006 | Gvily |
| 7,565,623 B2 | 7/2009 | Beam et al. |
| 7,765,491 B1 | 7/2010 | Cotterill |
| 7,797,643 B1 | 9/2010 | Jobs et al. |
| 8,205,168 B1 | 6/2012 | Van Slembrouck |
| 8,560,941 B2 | 10/2013 | Burns |
| 8,689,132 B2 | 4/2014 | Lamiraux et al. |

(Continued)

*Primary Examiner* — Roland J Casillas
(74) *Attorney, Agent, or Firm* — Kunzler Bean & Adamson; Bruce R. Needham (57) ABSTRACT

A responsive interface control system includes a display device and a control modification engine. The display device displays an interface control in a section of a user interface on the display device. The interface control is an interactive interface element configured to set an interface value. The control modification engine displays the interface control in a section of a user interface on a display device. The interface control is an interactive interface element configured to set an interface value. The control modification engine also displays both a slider and a spinner to implement a spin-slider mode. The interface control is configured to perform a spin function in response to an interaction with the slider to alter the interface value in the spin-slider mode.

20 Claims, 5 Drawing Sheets

(56) References Cited

U.S. PATENT DOCUMENTS

| | | |
|---|---|---|
| 8,856,682 B2 | 10/2014 | Moore et al. |
| 2002/0118168 A1 | 8/2002 | Hinckley et al. |
| 2003/0107604 A1 | 6/2003 | Ording |
| 2005/0262451 A1 | 11/2005 | Remignanti et al. |
| 2007/0016874 A1 | 1/2007 | Chaudhri |
| 2007/0143706 A1* | 6/2007 | Peters ................ G06F 3/04855 715/786 |
| 2007/0192744 A1* | 8/2007 | Reponen ............... G06F 3/0236 715/833 |
| 2008/0052637 A1 | 2/2008 | Ben-Yoseph et al. |
| 2009/0055768 A1 | 2/2009 | Chaudhri et al. |
| 2009/0070707 A1 | 3/2009 | Schaller et al. |
| 2009/0293019 A1 | 11/2009 | Raffel et al. |
| 2009/0306794 A1 | 12/2009 | Eischeid et al. |
| 2010/0039400 A1* | 2/2010 | Jang ..................... G06F 3/0485 345/173 |
| 2010/0115457 A1 | 5/2010 | Bombolowsky et al. |
| 2010/0275033 A1 | 10/2010 | Gillespie et al. |
| 2011/0126158 A1 | 5/2011 | Fogarty et al. |
| 2011/0202871 A1 | 8/2011 | Bair et al. |
| 2011/0246943 A1 | 10/2011 | Fujibayashi |
| 2012/0206495 A1* | 8/2012 | Endo .................... G06F 3/0481 345/661 |
| 2013/0014057 A1 | 1/2013 | Reinpoldt et al. |
| 2013/0132892 A1* | 5/2013 | Lentz ................... G06F 3/0488 715/786 |
| 2014/0250372 A1 | 9/2014 | Slembrouck |

\* cited by examiner

FIB. 4C

VALUE SPECIFICATION IN A RESPONSIVE INTERFACE CONTROL

CROSS-REFERENCE TO RELATED APPLICATIONS

This application is a continuation of U.S. application Ser. No. 13/485,384, filed on May 31, 2012, which is incorporated by reference herein in its entirety.

BACKGROUND

Web based user interfaces appear on many types of devices having varying screen resolution, including large desktop devices, laptops, netbooks, tablets, smart phones, and other devices. Responsive web user interfaces adapt the user interface to each individual device type so that it renders appropriately depending on the display size and platform type (e.g. the specific operating system for a given device). Responsive user interfaces may also be used in applications other than web based user interfaces.

In responsive web applications and other interface applications, browser capabilities and application code work together to adapt content to be displayed. Because display devices for the various devices can be many different sizes, shapes, and display types, the user interface components may also need to be configured or coded to adapt to the available screen real estate for the specific display device in which the components are implemented.

SUMMARY

Embodiments of a system are described. In one embodiment, the system is a responsive interface control system. An embodiment of the responsive interface control system includes a display device and a control modification engine. The display device displays an interface control in a section of a user interface on the display device. The interface control is an interactive interface element configured to set an interface value. The control modification engine displays the interface control in a section of a user interface on a display device. The interface control is an interactive interface element configured to set an interface value. The control modification engine also displays both a slider and a spinner to implement a spin-slider mode. The interface control is configured to perform a spin function in response to an interaction with the slider to alter the interface value in the spin-slider mode. Other embodiments of the system are also described.

Embodiments of a method are described. In one embodiment, the method facilitates value specification in a responsive interface control. One embodiment of the method includes displaying the interface control in a section of a user interface on a display device. The interface control is an interactive interface element configured to set an interface value. The method also includes displaying both a slider and a spinner to implement a spin-slider mode. The method also includes performing a spin function in response to an interaction with the slider to alter the interface value in the spin-slider mode. Other embodiments of the method are also described.

Embodiments of a computer program product are described. In one embodiment, the computer program product includes a computer readable storage medium to store a computer readable program. The computer readable program, when executed by a processor within a computer, causes the computer to perform operations for value specification in a responsive interface control. An embodiment of the operations include displaying the interface control in a section of a user interface on a display device. The interface control is an interactive interface element configured to set an interface value. The operations also include displaying both a slider and a spinner to implement a spin-slider mode. The interface control is configured to perform a spin function in response to an interaction with the slider to alter the interface value in the spin-slider mode. Other embodiments of the computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIGS. 4A-4D depicts a schematic diagram of one embodiment of the responsive interface control of FIG. 1.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for value specification in a responsive interface control. More specifically, the system is configured to modify the interface control as the size of the section of the user interface in which the interface control is located changes. In one embodiment, the interface control is configured to have the appearance and function of a slider control when the section has a predetermined size dimension, and as the size dimension shrinks, the appearance and function of the interface control is changed to or incorporates a spin control. The interface control may include both slider and spin controls for various embodiments, and may include exclusively slider or spin controls in other embodiments.

In some conventional systems, interface controls such as web applications include code that detects the device type and screen resolution and then selects different types of content, possibly including widgets, to be displayed. One drawback to this approach may be that selection of widgets and content is code intensive and can result in two or more discrete renderings of widgets. If the number is high, a large amount of code may be required to reflect all the different discrete renderings of the widget. Also, when resizing a window or zooming, a discrete rendering approach results in a "jerky" effect, or non-smooth transitions, as the control moves between renderings. A user interface component/control that is able to automatically adapt its appearance and function to the screen real estate in a generally continuous fashion may be utilized for different displays with different resolutions or in a UI section with a customizable size or shape.

Figure 1:
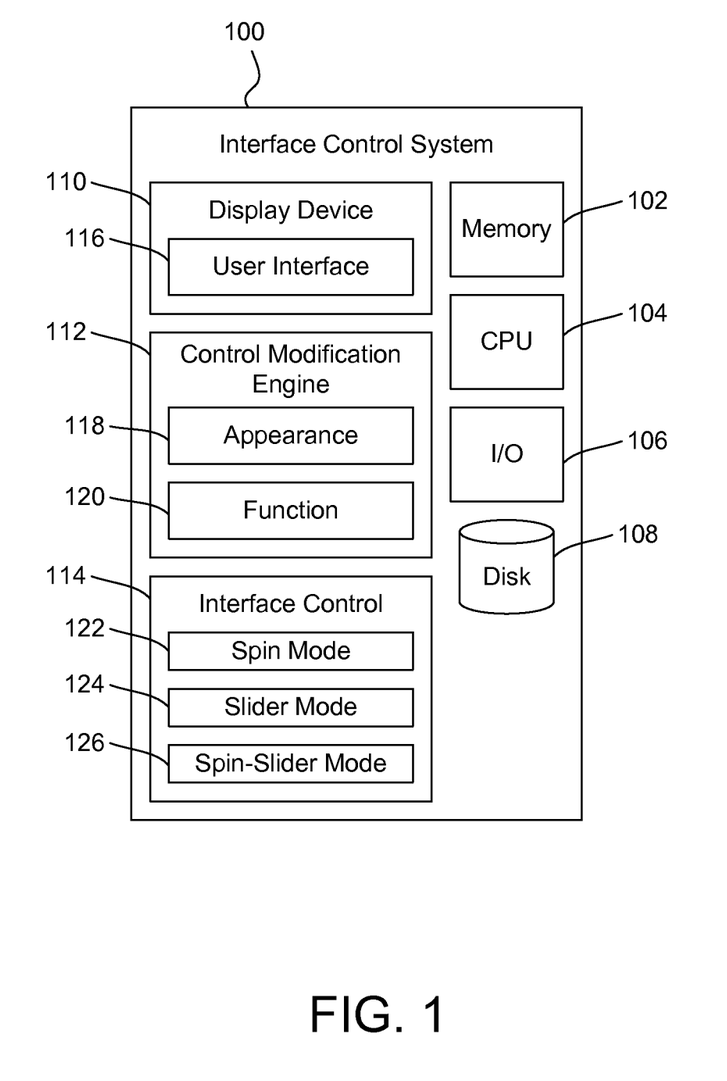
FIG. 1 depicts a schematic diagram of one embodiment of a responsive interface control system.
Figure 5:
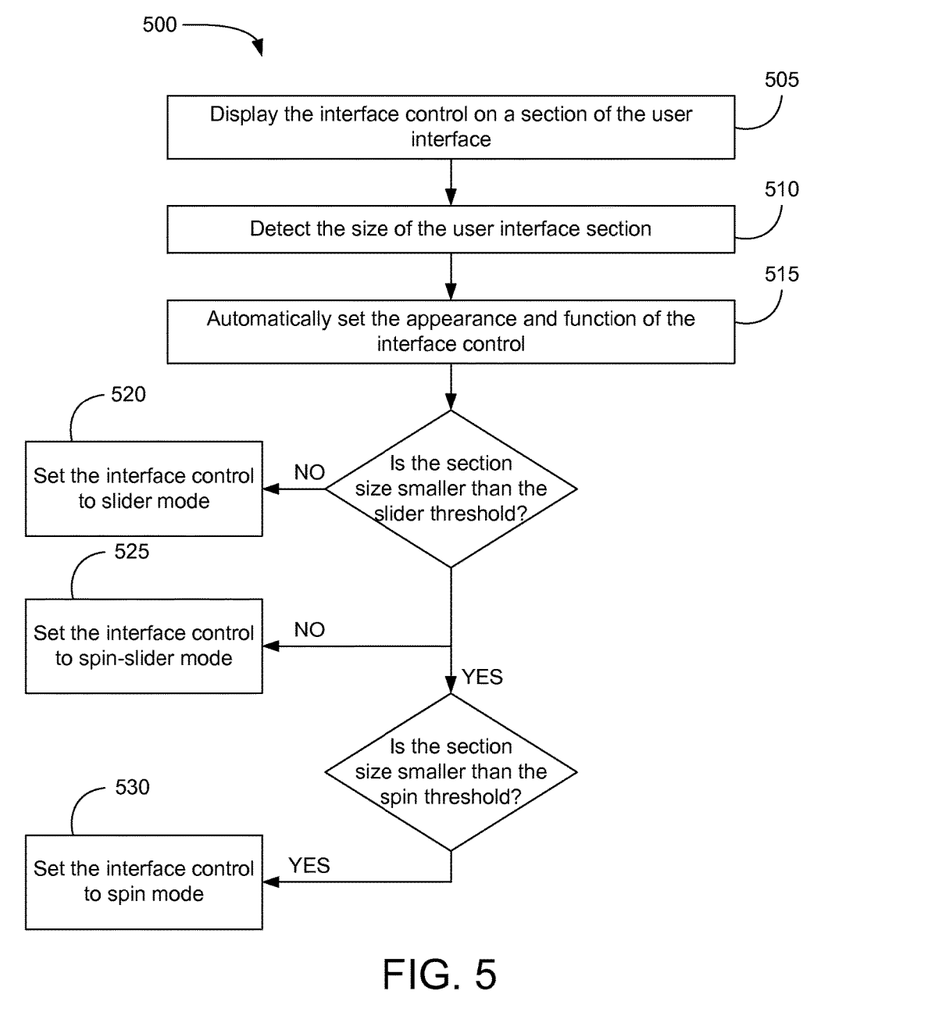
FIG. 5 depicts one embodiment of a method for value specification in a responsive interface control.

FIG. 1 depicts a schematic diagram of one embodiment of a responsive interface control system 100. The depicted interface control system 100 includes various components, described in more detail below, that are capable of performing the functions and operations described herein. In one embodiment, at least some of the components of the interface control system 100 are implemented in a computer system. For example, the functionality of one or more components of the interface control system 100 may be implemented by computer program instructions stored on a computer memory device 102 and executed by a processing device 104 such as a CPU. The interface control system 100 may include other components, such as a disk storage drive 108, input/output devices 106, a display device 110, control modification engine 112, and a responsive interface control 114. Some or all of the components of the interface control system 100 may be stored on a single computing device or on a network of computing devices, including a wireless communication network. The interface control system 100 may include more or fewer components or subsystems than those depicted herein. In some embodiments, the interface control system 100 may be used to implement the methods described herein as depicted in FIG. 5.

In one embodiment, the display device 110 is an input/output device configured to display a user interface 116 corresponding to the specific computer system. The user interface 116 may take up any portion of the display device 110, in various embodiments. The display device 110 may also be a touch display configured to receive input in some embodiments. The computer system may also include other input/output devices that allow the user to interact with the user interface 116. The interface control 114 may be displayed in a section of the user interface 116 and is an interactive interface element configured to set an interface value corresponding to some aspect of the user interface 116 or the computer system. The aspects of the user interface 116 include aspects of components within the user interface 116, including windows, browsers, widgets, or other components. For example, the interface control 114 may set a value for a setting corresponding to a particular application in the user interface 116.

The value controlled by the interface control 114 may be a numerical value corresponding to or representing the aspect of the user interface 116. Aspects that may be represented as a continuum of values, such as colors, may also generally be represented using numerical values. Consequently, the interface control 114 may be used to control a variety of aspects of a user interface 116. The user interface 116 may include an interface control 114 for each aspect of the user interface 116 that may be modified by the user.

In one embodiment, the control modification engine 112 is configured to set the interface control 114 according to the configuration of the display device 110, the user interface 116 or a particular section of the user interface 116 in which the interface control 114 is located. The appearance 118 and function 120 of the interface control 114 may be modified to make the interface control 114 easier to use for the given configuration, for example, by changing the size of the interface control 114 and by modifying the function in which the interface control 114 operates. In one embodiment, the control modification engine 112 sets an interface control mode that specifies the appearance 118 and the function 120 of the interface control 114.

In one embodiment, the interface control 114 may have several different control modes that specify the different appearance 118 and function 120 configurations of the interface control 114, including, but not limited to, a spin mode 122 and a slider mode 124. In one embodiment, the interface control 114 also includes a spin-slider mode 126 that incorporates elements of both the spin mode 122 and the slider mode 124. The interface control 114 may be set to the slider mode 124, spin-slider mode 126, and spin mode 122 as the size of the section of the user interface 116 in which the interface control 114 is located changes, or according to the default settings for different devices. The interface control 114 may be programmed to detect the display settings for the display device 110, such as the size of the user interface section, and to automatically set the appearance 118 and function 120 of the interface control 114 according to the detected settings.

Slider controls may help the user visualize a value's relative position between minimum and maximum values, but may require a considerable amount of horizontal or vertical screen real estate for adequate operation. Spin controls may include numerical input widgets that a user controls by clicking increment and decrement buttons to increase or decrease a value. Spin controls consume very little real estate, but only display a numeric value and may require multiple clicks, multiple touch gestures, or time-dependent button presses to set the desired value. A spin-slider control incorporates elements from both the slider control and the spin control, and may include various stages of appearance 118 and/or function 120.

Figure 2A:
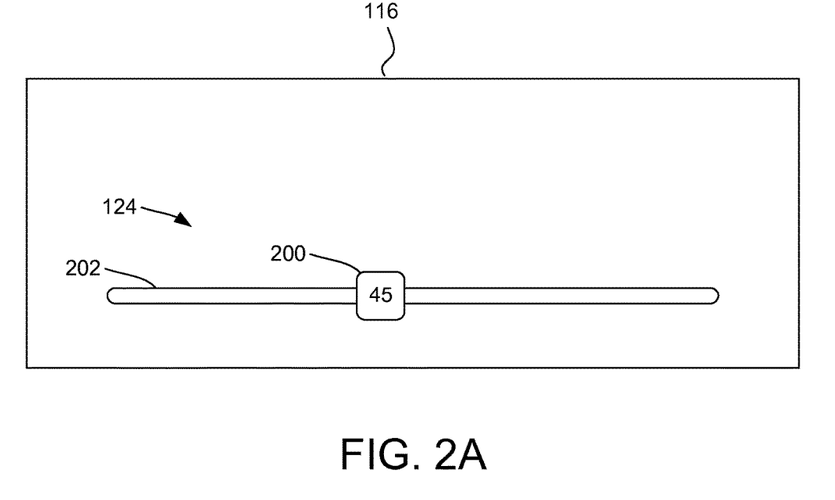
FIG. 2A-2B depicts a schematic diagram of one embodiment of the responsive interface control of FIG. 1.
Figure 2B:
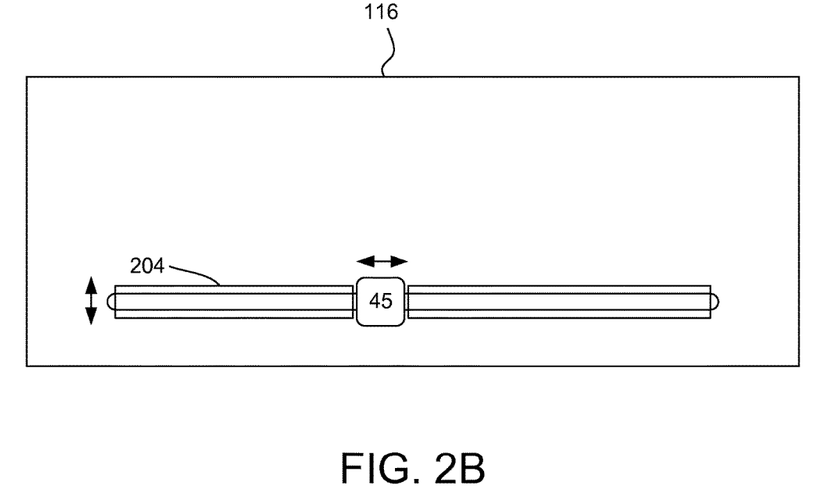

FIG. 2A-2B depict a schematic diagram of one embodiment of the responsive interface control 114 of FIG. 1. While the interface control system 100 is described herein in conjunction with the interface control 114 of FIG. 2, the responsive interface control system 100 may be used in conjunction with any interface control 114.

In one embodiment, the user interface 116 includes sufficient visual dimensions for the interface control 114 to operate in slider mode 124, also referred to herein as a slider control. A full slider control may allow the user to adjust the value in either large or small increments by sliding a slider element 200 along a track bar 202 in either a left or right direction. For example, the user may decrease the interface value by sliding the slider element 200 to the left on the track bar 202 or increase the interface value by sliding the slider element 200 to the right on the track bar 202. The user element may select the slider element 200 using a finger or stylus for a touch interface, or by directing a cursor to the slider element 200 using a mouse, track pad or other input device and clicking on the slider element 200.

In one embodiment, the slider element 200 displays the value at which the slider element 200 is located on the track bar 202. When the slider element 200 is selected, the value may appear above the slider element 200 so that the value may still be seen when the cursor, stylus, finger, or other selection tool is positioned on the slider element 200. In other embodiments, the value may be shown elsewhere.

In one embodiment, the slider control is displayed with a horizontal track bar 202 in a section of the user interface 116 that has a horizontal dimension greater than a slider threshold. The slider threshold may be used to determine whether the interface control 114 may be presented and used in the slider mode 124 in the section of the user interface 116. In the present embodiment, as the horizontal dimension of the user interface section decreases, fine-tuning the value for the interface control 114 using a slider control may be increasingly difficult as the value gain increases for movements of the slider element 200 along the track bar 202. Consequently, the usefulness of a full slider control may also decrease.

The slider threshold may be determined based on various rules, including the size of the user interface section or the range of values controlled by the interface control 114. For example, if the aspect controlled by the interface control 114 includes a large number of possible values, small adjustments to the interface control 114 may result in a large change in value. If the aspect controlled by the interface control 114 includes a small number of possible values, small adjustments to the interface control 114 may result in a small change in value or no change in value. Consequently, the slider threshold may be different for an interface control 114 with many possible values than for an interface control 114 with few possible values. In other embodiments, the slider threshold may be determined using other data, including data that is manually input by a developer or a user.

In one embodiment, the slider mode 124 may incorporate functions of a spin control, such that the spin functions may be used to make very fine adjustments to the value while the interface control 114 is in slider mode 124. For example, a swiping motion up or down on a touch interface on either side of the slider element 200 changes the value in small increments. The amount the value changes may vary with the length of the gesture made by the user. A longer gesture may increment the value more than a shorter gesture. The amount the value changes may also vary with the speed of the gesture. A quick gesture may spin the control quickly, resulting in faster changes, and a slow gesture may spin the control slowly, resulting in slower changes. When the user is operating the spin functions of the slider control, the slider control may modify the appearance 118 of the interface control 114 to show spin elements 204, such as rollers on the track bar 202, so that the user knows that the spin controls are active. Otherwise, the spin elements 204 may be hidden. In one embodiment, the size of the spin elements changes dynamically as the position of the slider element 200 on the track bar 202 changes.

In another embodiment, the value may be changed in small increments by tapping on the track bar 202. For example, tapping to the left of the slider element 200 may decrease the value by one for each tap, and tapping to the right of the slider element 200 may increase the value by one for each tap. The position of the slider element 200 adjusts accordingly as the value moves up or down. In various embodiments, the user may specify the increments at which each user action changes the value to personalize the operation of the interface control 114.

Figure 3:
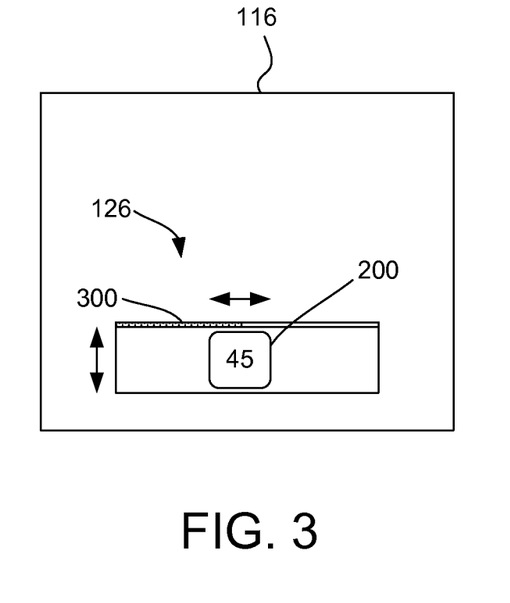
FIG. 3 depicts a schematic diagram of one embodiment of the responsive interface control of FIG. 1.

FIG. 3 depicts a schematic diagram of one embodiment of the responsive interface control 114 of FIG. 1. While the interface control system 100 is described herein in conjunction with the interface control 114 of FIG. 3, the responsive interface control system 100 may be used in conjunction with any interface control 114.

The system 100 is configured to change the interface control 114 from the slider mode 124 to another mode when the size of the user interface section becomes smaller than the slider threshold. In one embodiment, the interface control 114 is changed to a spin-slider mode 126 in response to the size of the user interface section dropping below the slider threshold. The spin-slider mode 126 may include some or all functional properties of a slider control and a spin control.

In one embodiment, the interface control 114 operates in the spin-slider mode 126 when the size of the user interface section is below the slider threshold and equal to or greater than the spin threshold. Consequently, the spin-slider mode 126 may be an intermediate mode in which the interface control 114 operates when the interface control 114 is not sufficiently large to accommodate the slider mode 124 and is sufficiently large to accommodate a mode larger than a minimalist spin control.

In one embodiment, the interface control 114, when in the spin-slider mode 126, includes a slider element 200 that allows the user to adjust the value by moving the slider element 200 along the track bar 202. The interface control 114 also includes a spin element 204 that allows the user to adjust the value by clicking or spinning the spin element 204 up or down. In one embodiment, the appearance 118 of the track bar 202 may be modified to look like a roller or other spin element 204. The slider element 200 may move along the spin element 204 just as the slider element 200 moves along the track bar 202 in the slider mode 124. In some embodiments, the slider element 200 is used to make coarse adjustments to the value, while the spin element 204 is used to make fine adjustments to the value. For example, moving the slider element 200 to the left or right on the track bar 202 may result in changing the value in increments greater than by adjusting the spin element 204 up or down.

While the interface control 114 is in the spin-slider mode 126, the gain of the interface control 114 may also be increased programmatically for making sliding movements, due to the decreased space allotted to the interface control 114. The gain for spinning/rolling movements may also be increased as the size of the interface control 114 decreases. As described in conjunction with the slider mode 124, tapping to the left or right of the slider element 200 on the track bar 202 may also decrease or increase the value in small increments. The value may be shown on the slider element 200. In one embodiment, the interface control 114 also includes a thin position bar 300 above the track bar 202 and slider element 200 that indicates the relative position of the slider in the range of values corresponding to the interface control 114.

FIG. 4A-4D depicts a schematic diagram of one embodiment of the responsive interface control 114 of FIG. 1. While the interface control system 100 is described herein in conjunction with the interface control 114 of FIGS. 4A-4D, the responsive interface control system 100 may be used in conjunction with any interface control 114.

The interface control 114 depicted in the present embodiment may be operating in its most compact state. When the size of the user interface section in which the interface control 114 is located is detected to be below a spin threshold, the appearance 118 and function 120 of the interface control 114 may be set to the spin mode 122. The spin threshold may be determined based on various rules, such as the size of the user interface section or the range of values controlled by the interface control 114. For example, the spin threshold may be different for an interface control 114 with many possible values than for an interface control 114 with few possible values.

In one embodiment, when the interface control 114 is changed from the spin-slider mode 126 to the spin mode 122, the slider element 200 becomes a spin element 204. In another embodiment, the spin threshold may be equal to the slider threshold, such that the interface control 114 is not set to a spin-slider mode 126, and may change directly between a spin mode 122 and a slider mode 124. The value may be shown on the slider element 200 in some embodiments. In one embodiment, the spin mode 122 includes a position bar 300 or indicator showing the value for the current position of the spin element 204 relative to the lowest and highest possible values for the interface control 114.

Figure 4A:
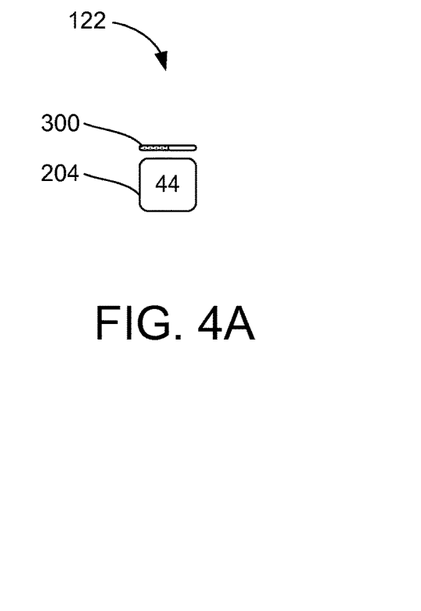
Figure 4B:
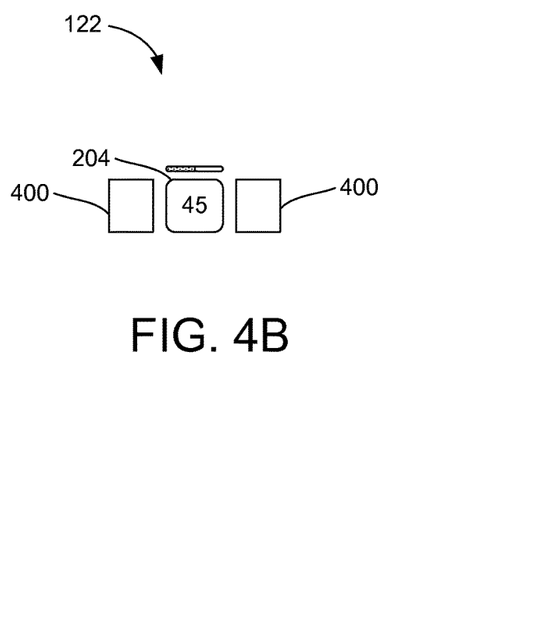
Figure 4D:
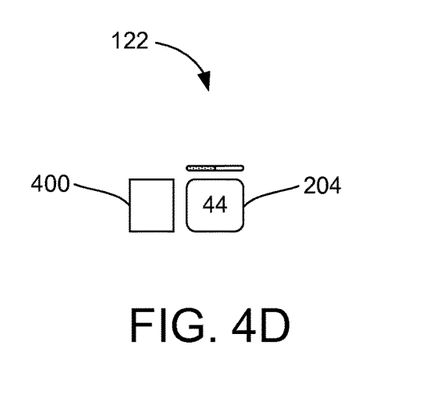

The default state of the interface control 114, as shown in FIG. 4A, includes the spin element 204 and the position bar 300 showing the current value. When the user selects or touches the spin control, buttons 400 to the right and left of the spin element 204 appear, as in FIG. 4B. In one embodiment, the user may make coarse adjustments to the value by performing a spinning action on the spin element 204. The buttons 400 to the left and right of the spin element 204 may be used to make fine adjustments to the value. For example, the user may press the button 400 to the right of the spin element 204 to increment the value, as shown in FIG. 4C. The user may press the button 400 to the left of the spin element 204 to decrement the value, as shown in FIG. 4D. In one embodiment, pressing the buttons 400 increments or decrements the value by one with each press. The gain for each of the components in the spin mode 122 may be set manually to customize the user experience in some embodiments.

FIG. 5 depicts one embodiment of a method for value specification in a responsive interface control 114. Although the method 500 is described in conjunction with the responsive interface control system 100 of FIG. 1, embodiments of the method 500 may be implemented with other types of responsive interface control systems 100.

The system 100 displays 505 the interface control 114 on a section of the user interface 116. The interface control 114 is an interactive interface element configured to set an interface value. In one embodiment, the section of the user interface 116 includes any area or region in the user interface 116 in which an interface control 114 may be displayed. In some embodiments, the section is resizable, such as a browser window. In other embodiments, the section may not be resizable for a specific device, such as a browser window on a smart phone or other mobile device.

The system 100 is configured to detect 510 the size of the user interface section. In some embodiments, this may include detecting a fixed size of the user interface section. In other embodiments, this may include detecting a change in the size of the user interface section, for example, when a web browser window is resized.

The system 100 then automatically sets 515 the interface control mode that specifies the appearance 118 and the function of the interface control 114. In various embodiments, the appearance 118 and the function 120 may be configured to operate in one of a plurality of predetermined interface control modes. In one embodiment, the predetermined interface control modes include a slider mode 124, a spin mode 122, or a spin-slider mode 126. The interface control 114 may be set 520 to operate in the slider mode 124 in response to determining that the size of the section of the user interface 116 is greater than the slider threshold. The interface control 114 may be set 530 to operate in the spin mode 122 in response to determining that the size of the section of the user interface 116 is smaller than the spin threshold. The interface control 114 may be set 525 to operate in the spin-slider mode 126 in response to determining that the size of the section of the user interface 116 is between the slider threshold and the spin threshold. The spin-slider mode 126 may include properties from both the spin mode 122 and the slider mode 124, such that the interface control 114 is configured to perform a slider function and a spin function to alter the interface value while in the spin-slider mode 126.

In one embodiment, the spin mode 122 includes an increment button and a decrement button that increment or decrement, respectively, the interface value in response to a user action. The gain corresponding to the increment and decrement buttons is smaller than a rolling action while in spin mode 122. In some embodiments, the gain for the user action on the interface control 114 is increased in response to a decrease in the size of the user interface section and decreased in response to an increase in the size of the user interface section.

An embodiment of a responsive interface control system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation for value specification in a responsive interface control 114.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product for performing value specification in an interface control, the computer program product comprising a non-transitory computer readable storage medium program instructions executable by a processor to cause the processor to perform:

displaying the interface control in a section of a user interface on a display device, wherein the interface control is an interactive interface element configured to set an interface value;

displaying a slider on the interface control, the slider comprising a track bar and a slider element on the track bar;

adjusting the interface value in response to performing a slider function, the slider function comprising a user selecting the slider element and sliding the slider element a distance along a length of the track bar, wherein adjusting the interface value is proportional to the distance that the slider element slides relative to the length of the track bar; and overlaying the length of the track bar on either side of the slider element with a spin element that substantially overlaps the length of the track bar except a small portion of the track bar at both ends of the track bar is not overlapped by the spin element; and performing a spin function that incrementally adjusts the interface value in response to a second interaction comprising a spin gesture, the spin gesture comprising a swiping motion across the spin element at any point along the spin element, with at least a portion of the spin gesture in a direction perpendicular to a direction that the slider element moves along the track bar, and wherein the spin element remains stationary in response to the spin gesture.

2. The computer program product of claim 1 wherein the interface control is configured to adjust the interface value at a first rate in response to the slider function and to adjust the interface value at a second rate in response to the spin function, and wherein the first rate is greater than the second rate.

3. The computer program product of claim 1, wherein the interface control is further configured to show the spin element on the slider to indicate an active state of the spin function via the slider.

4. The computer program product of claim 1, wherein the interface control is further configured to hide the spin element from display on the slider while the spin function is inactive via the slider.

5. The computer program product of claim 1, wherein the display has a touch interface and the interface control is further configured to perform the spin function in a first direction in response to a first spin gesture on the spin element in a first direction across and perpendicular to the length of the slider and to perform the spin function in a second direction in response to a second spin gesture in a second direction, wherein the second spin gesture is in a direction opposite to the first spin gesture.

6. The computer program product of claim 1, wherein the interface control is further configured to adjust the interface value in increasing increments in response to an increasing length of the spin gesture of the spin function.

7. The computer program product of claim 1, wherein the interface control is further configured to adjust the interface value in increasing increments in response to an increasing speed of the spin gesture of the spin function.

8. The computer program product of claim 1, further comprising dynamically changing the size of the spin elements in response to a change in a position of the slider element on the track bar, wherein the spin elements maintain coverage of either side of the slider element with movement of the slider element.

9. The computer program product of claim 1, further comprising incrementally adjusting the interface value in response to a tapping gesture at any point along the track bar that is not overlapped by the slider element.

10. The computer program product of claim 9, further comprising adjusting a position of the slider element in response to the tapping gesture.

11. The computer program product of claim 1, further comprising an interface control adjustment, wherein the interface control comprises a slider with the spin controls disabled in response to the interface control comprising a size above a predetermined size dimension and wherein the interface control comprises a slider with the spin controls enabled in response to the interface control comprising a size equal to or below the predetermined size dimension.

12. A method for value specification in a responsive interface control, the method comprising:
displaying the interface control in a section of a user interface on a display device, wherein the interface control is an interactive interface element configured to set an interface value;
displaying a slider on the interface control, the slider comprising a track bar and a slider element on the track bar that performs a slider function;
adjusting the interface value in response to a first interaction comprising a user selecting the slider element and sliding the slider element a distance along a length of the track bar, wherein the adjustment of the interface value is proportional to the distance that the slider element slides relative to the length of the track bar;
overlaying the length of the track bar on either side of the slider element with a spin element that substantially overlaps the length of the track bar except a small portion of the track bar at both ends of the track bar is not overlapped by the spin element; and
performing a spin function that incrementally adjusts the interface value in response to a second interaction comprising a spin gesture, the spin gesture comprising a swiping motion across the spin element with at least a portion of the spin gesture in a direction perpendicular to a direction that the slider element moves along the track bar, and wherein the spin element remains stationary in response to the spin gesture.

13. The method of claim 12,
wherein the second interaction is in a second direction that is perpendicular to the length of the track bar.

14. The method of claim 13, wherein the interface control adjusts the interface value at a first rate in response to the slider function and adjusts the interface value at a second rate in response to the spin function, and wherein the first rate is greater than the second rate.

15. The method of claim 13, further comprising displaying the spin element on the track bar of the slider to indicate an active state of the spin function via the slider.

16. The method of claim 15, wherein:
performing the spin function in a first direction in response to a first spin gesture in a first direction on the spin element across and perpendicular to the length of the slider; and
performing the spin function in a second direction in response to a second spin gesture in a second direction opposite the first direction.

17. The method of claim 12, wherein the interface control is further configured to adjust the interface value in increasing increments in response to an increasing length of the spin gesture of the spin function.

18. The method of claim 12, wherein the interface control is further configured to adjust the interface value in increasing increments in response to an increasing speed of the spin gesture of the spin function.

19. The method of claim 12, further comprising hiding the spin elements on the slider control to indicate an inactive state of the spin function via the slider in response to detecting a user selecting the slider element.

20. A system comprising:
a display device with a touch interface;
at least one processor coupled to memory storing code that is executable by the at least one processor to perform operations for value specification in a responsive interface control, the operations comprising:
displaying the interface control in a section of a user interface on the display device, wherein the interface control is an interactive interface element configured to set an interface value;
display a slider on the interface control, the slider comprising a track bar and a slider element on the track bar that performs a slider function;
adjusting the interface value in response to a first interaction comprising a user selecting the slider element and sliding the slider element a distance along a length of the track bar, wherein the adjustment of the interface value is proportional to a distance that the slider element slides relative to the length of the track bar; and
overlaying side portions along the length of the track bar on either side of the slider element with a spin element that substantially overlaps the length of the track bar except for a small portion of the track bar at both ends of the track bar that is not overlapped by the spin element; and
performing a spin function that incrementally adjusts the interface value in response to a second interaction being a spin gesture, the spin gesture comprising a swiping motion across the spin element with at least a portion of the spin gesture in a direction perpendicular to a direction that the slider element moves along the track bar, and wherein the spin element remains stationary in response to the spin gesture.

* * * * *